United States Patent

Trader et al.

[11] Patent Number: 5,819,250
[45] Date of Patent: Oct. 6, 1998

[54] METHOD AND SYSTEM FOR MULTIMEDIA INTERACTION WITH A DATABASE

[75] Inventors: Terry F. Trader, Castle Rock; Leslie Darrell Cox, Arvada; Michael Gregory Gibson, Englewood, all of Colo.; Jeffrey Lloyd Kienker, Kailua-Kona, Hi.

[73] Assignee: U S West, Inc., Englewood, Colo.

[21] Appl. No.: 587,124

[22] Filed: Jan. 9, 1996

[51] Int. Cl.[6] .............................. G06F 17/30; G06F 13/00
[52] U.S. Cl. ............................................... 707/1; 395/500
[58] Field of Search ................... 395/785, 500, 395/610, 615, 616, 681, 682, 200.09, 200.12; 707/1, 10, 104, 200

[56] References Cited

U.S. PATENT DOCUMENTS

| | | | |
|---|---|---|---|
| 5,210,824 | 5/1993 | Putz et al. ............................... | 395/145 |
| 5,303,343 | 4/1994 | Ohya et al. ............................... | 395/500 |
| 5,345,586 | 9/1994 | Hamala et al. ........................... | 395/650 |
| 5,412,774 | 5/1995 | Agrawal et al. .......................... | 395/157 |
| 5,502,839 | 3/1996 | Kolnick .................................... | 395/800 |
| 5,553,223 | 9/1996 | Greenlee et al. ........................ | 395/155 |
| 5,557,790 | 9/1996 | Bingham et al. ........................ | 395/612 |
| 5,574,904 | 11/1996 | Yunoki et al. ........................... | 395/601 |

*Primary Examiner*—Paul V. Kulik
*Attorney, Agent, or Firm*—Stephen F. Jewett; Brooks & Kushman P.C.

[57] ABSTRACT

A method and system for interacting with a database via multiple types of media where the database includes data lacking a format for use with each of the media. The method includes selecting data to be accessed, selecting one of the media for providing access to the data selected, automatically formatting the data selected for use with the media selected, and transmitting the formatted data for output via the media selected. The system includes a processor, memory, software and media required for performing the method.

18 Claims, 3 Drawing Sheets

500

METHOD AND SYSTEM FOR MULTIMEDIA INTERACTION WITH A DATABASE

TECHNICAL FIELD

This invention relates to a method and system for interacting with a database via a plurality of media.

BACKGROUND ART

A wide variety of media exist for accessing and interacting with database stored information. Such media include telephone, television, computers, facsimile machines, and hearing impaired devices for providing output of such data in audio, video, graphic, text and other formats.

Current methods and system for providing such access and interaction, however, require that information stored in the database be replicated and copied for each type of media output employed. That is, each screen, document or other type of output desired must be created and stored ahead of time. Such re-creation and storage of the data assets for each media type increases production time, as well as the overall amount of storage required to deliver multiple media output. As a result, information stored on most databases is available for access and interaction via only a limited number of media types.

A need therefore exists for an improved method and system for multimedia interaction with a database which would solve the problem of having to re-create and store data assets for each media type. Such a method and system would permit each data asset to be stored only once as a unique entity, and would format such assets as needed according to user search criteria for immediate output via any media type requested. In such a fashion, such a method and system would reduce and/or eliminate the production time and storage requirement problems of the prior art, while allowing for real time interaction with the database.

DISCLOSURE OF INVENTION

Accordingly, it is the principle object of the present invention to provide an improved method and system for multimedia interaction with a database.

According to the present invention, then, a method and system are provided for interacting with a database via a plurality of media. The database has data lacking a format for use with each of the plurality of media. The method of the present invention comprises selecting data to be accessed, and selecting one of the plurality of media for providing access to the data selected. The method further comprises formatting automatically the data selected for use with the one of the plurality of media selected, and transmitting the formatted data for output via the one of the plurality of media selected.

The system of the present invention comprises means for selecting data to be accessed, and means for selecting one of the plurality of media for providing access to the data selected. The system further comprises means for formatting the data selected for use with the one of the plurality of media selected, and means for transmitting the formatted data for output via the one of the plurality of media selected.

These and other objects, features and advantages will be readily apparent upon consideration of the following detailed description in conjunction with the accompanying drawings.

BEST MODE FOR CARRYING OUT THE INVENTION

Figure 1:
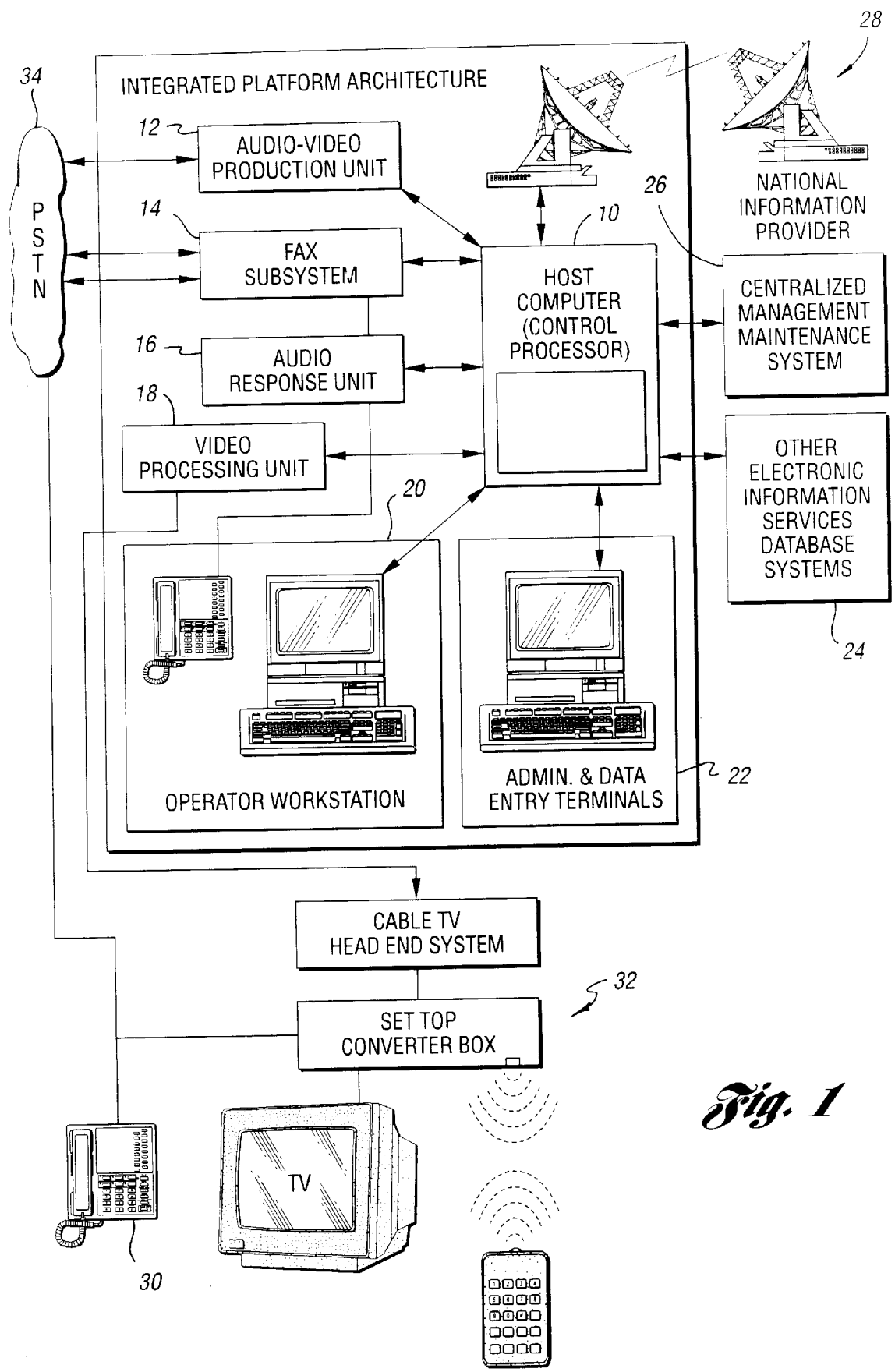
FIG. 1 is a architectural diagram of the system of the present invention.

Referring first to FIG. 1, an architectural diagram of the system of the present invention is shown. As seen therein, the system comprises a host computer (10) provided in communication with various input and output devices. More particularly, host computer (10) receives input from and/or transmits output to an audio-video production unit (12), a fax subsystem (14), an audio response unit (16), a video processing unit (18), operator workstations (20), administration and data entry terminals (22), other electronic information services database systems (24), a centralized management maintenance system (26), and national information providers (28).

A telephone (30) or interactive television system (32) may be provided for user access to the system via a Public Switched Telephone Network (PSTN) (34). Other types of media may also be provided for user access to the system, such as a facsimile machine, a personal computer terminal, or a hearing impaired terminal (not shown).

Generally, host computer (10) and/or various input and output devices, such as fax subsystem (14), audio response unit (16), and video processing unit (18), include appropriate software for formatting database information for immediate delivery via any type of interactive media product including telephone, fax, television, computer, print, and terminals for the hearing impaired. Thus, each audio, video and/or text data asset need not be created ahead of time and stored on the system. Instead, each data asset is stored as a unique entity and composed and delivered to meet the search criteria and media type requested in real time by the user.

Figure 2:
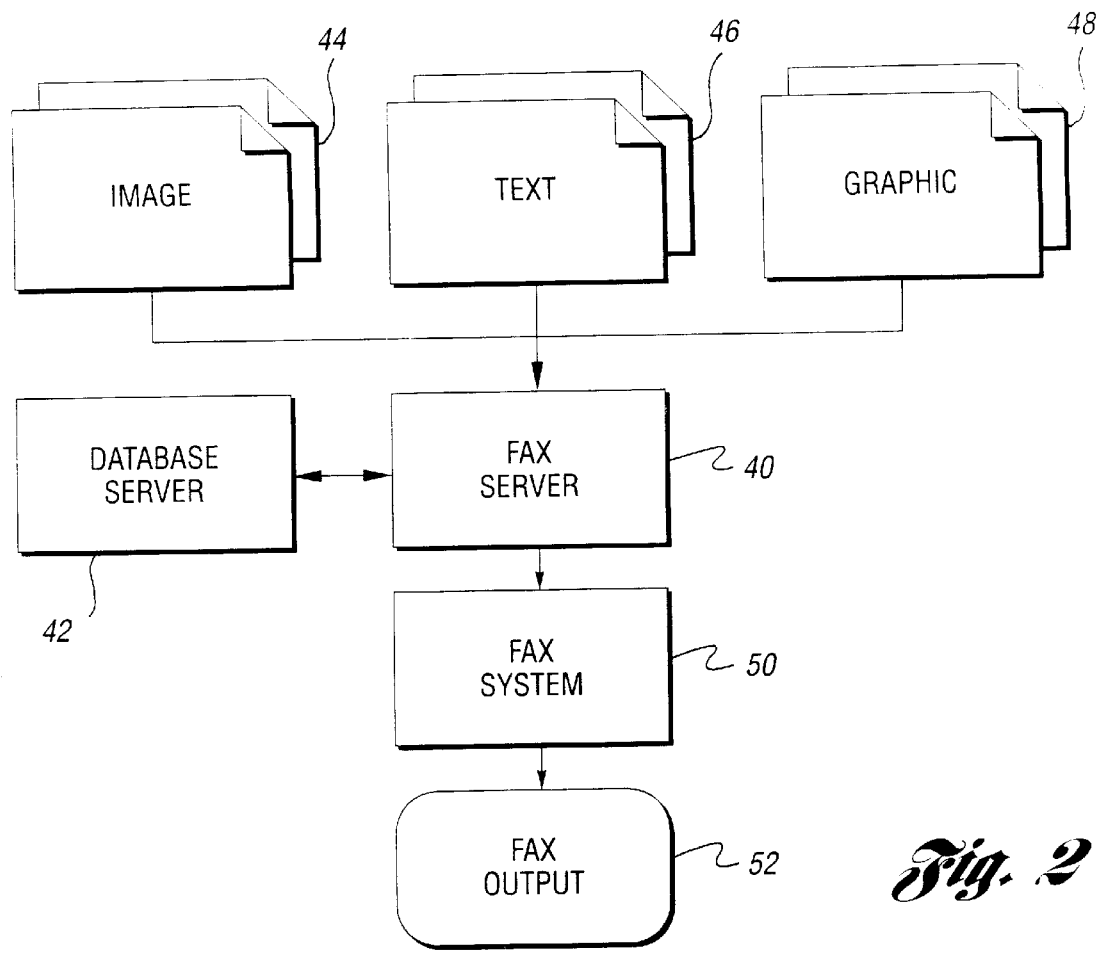
FIG. 2 is a block diagram of one embodiment of the system of the present invention.

More specifically, referring now to FIG. 2, a block diagram of one embodiment of the system of the present invention is shown. As seen therein, fax server (40) is provided in communication with database server (42). As the result of a database query from database server (42), various image (44), text (46), and graphic (48) data elements are gathered and transmitted to fax server (40).

Database server (42) includes a fax composing program, or templates. Using that template, such elements are placed on a "page" based on rules and page geometry definitions. Depending upon the media specified, the attributes of the template may include the necessary processing for static hard-copy output to full-motion animation and/or audio. After output definitions are established in the application, output is generated without human intervention. Thus, the method and system of the present invention can automatically produce hard-copy, video and/or audio output relying on configuration files and database queries, thereby reducing production time and permitting real time interaction with a database.

Once a template is laid out for each particular media type, the method and system automatically place data into the right places on that media. For example, among other things, a template for a printed document may indicate picture location, text location, and page breaks. Similarly, a template for a television application may indicate background color, text location, the timing for audio, and the timing for moving from one screen to the next. A template for audiotex may indicate the timing for audio. The system and method thereby reduce the overall amount of data storage required to deliver multiple media output.

Fax server (40) is also provided in communication with fax system (50). Once the data elements (44, 46, 48) have been properly formatted via the fax template of database server (42), fax system (50) transmits the actual fax output (52), which may have images and text including a cover page and a page footer.

With respect to the specific embodiment of FIG. 2, the following is an example of a template for providing output via a facsimile machine. Those of ordinary skill in the art will recognize that similar templates can be created for any media application, such as interactive television, telephone, computer terminal and hearing impaired terminal:

I. Description of Outputs

Deliverable outputs are fax pages generated from text resulting from a database query. Ads will be formatted from templates, and pages will be calculated from page templates. The fax page will be imaged in CCITT Group3 format, following specific page layout guidelines. Text will be imaged with font and pointsize requirements. Images in RGB, TIFF, PICT, GIF, PS, NTSC will be converted to the Group3 format and at a specific halftone screening as the entire page is rasterized. Sub-phases include a) image listing text elements and fax page header images; b). image all of sub-phase (a) plus static images; and c) image all of sub-phases (a) and (b) plus the incorporation of single-frame video images.

II. Specification Objective

To describe the fax page deliverable for automobiles:
1) Page Layout
2) Ad Templates
3) Font Usage
4) Image/Halftone Requirements
5) Display Advertising Requirements
6) Filler Advertising Requirements
7) Starter Pages and Fax Footers III. Specification 1. Page Layout:

| Page Size: | Physical Output Advertising Area: | 8.5" × 11" |
|---|---|---|
| | Imaging Width | 576 points |
| | Imaging Length | 720 points |

The page is divided into sectors. There are 16 sectors per fax page. Each sector is 90 points V×288 points H.

| FaxInfoHeader | Horizontal | 576 points |
|---|---|---|
| | Vertical | 9 points |
| FaxInfoSep | | 2 pt Rule |
| PageFooter | Horizontal | 576 points |
| | Vertical | 61 points |

2. Ad Templates:

There are two basic types of advertising, listing advertising and display advertising.
  a. Listing Advertising:
    Two sizes of text ads:
      1) 90 points V×576 points H—Two horizontally adjoining sectors.
      2) 180 V×576 points H—Two horizontal and two vertically adjoining sectors.
    One photo ad size:
      1) 180 points V×576 points H—Two horizontal and two vertically adjoining sectors.
    Listing advertising conforms to a three column format where:
      1) Column 1—Flush left
      2) Column 2—Flush left
      3) Column 3—Flush left
      4) 180 point column width
      5) 18 point gutters separating the three columns
      6) 2 pt rule at bottom of ad
  b. Display Advertising:
    1) There are 16 different sizes available—from 1 sector to 16 sectors—or full page.
    2) All multiple sector Display Ads form rectangles.
    3) Where different Display Ads meet, a 2 pt rule is formed.
    4) Display ads must maintain a ⅛" white border.

3. Font Usage:

A monospace font will be used for imaging. A variety of fonts may, however, be used.

Text Ad 1:

| | | |
|---|---|---|
| MFG_NAME + MODEL_NAME separated by space/hyphen/space Baseline 21 points from top rule Quad Center - Column 2 | 18/18sw CourierBold | |
| | required | |

Listing Text:

Column 1:

| | | |
|---|---|---|
| MANUFACTURE_YR Baseline 18 points from top YEAR: (5 spaces) (copy) Quad Left | 16/16sw - Courier | |
| | required | |
| SELLING_PRICE Follows MANUFACTURE_YR Baseline 36 points from top PRICE: (4 spaces) (copy) Quad Left | 16/16sw - Courier | |
| | required | |
| PRICE_ExtraLine Follows SELLING_PRICE on pointsize lead (10 spaces) (copy) Quad Left | 16/16sw - Courier | |
| | optional | |
| CUSTOMER_PHONE_NUMBER Follows SELLING_PRICE Baseline: 65 points PHONE: (4 spaces) (copy) Quad Left | 16/16sw - Courier | |
| | required | |
| PHONE_ExtraLine Follows CUSTOMER_PHONE_NUMBER on pointsize lead (10 spaces) (copy) Quad Left | 16/16sw - Courier | |
| | optional | |

Column 2:

| | |
|---|---|
| VHCL_OPTION baseline 40 points from top (copy) Quad Center | 16/16sw - Courier Text Block 180 points wide - 3 lines no hyphenation optional |

Column 3:

| | |
|---|---|
| (VHCL_OPTIONS) - other Baseline 18 points from top (copy) Quad Left | 16/16sw - Courier Text Block 180 points wide-19 char 3 lines no hyphenation optional |

Seller_ID  
Baseline - 86 points  
from top  
(copy)  
Quad Right  
16/16sw - Courier  
Text Block 180 points wide-19 char  
1 line Text Ad 2:

Listing Header:

MFG_NAME + MODEL-NAME  
separated by space/hyphen/space  
Baseline 21 points from top rule  
Quad Center - Column 2  
18/18sw - CourierBold required Listing Text:

Column 1:

MANUFACTURE_YR  
Baseline 18 points from top  
YEAR: (5 spaces) (copy)  
Quad Left  
16/16sw - Courier required SELLING_PRICE  
Follows MANUFACTURE_YR  
Baseline 36 points from top  
PRICE: (4 spaces) (copy)  
Quad Left  
16/16sw - Courier required PRICE_ExtraLine  
Follows SELLING_PRICE  
on pointsize lead  
(10 spaces) (copy)  
Quad Left  
16/16sw - Courier optional CUSTOMER_PHONE_NUMBER  
Follows SELLING_PRICE  
Baseline 65 points from top  
Quad Left  
16/16sw - Courier required PHONE_ExtraLine  
Follows CUSTOMER_PHONE_NUMBER  
on pointsize lead  
(10 spaces) (copy)  
Quad Left  
16/16sw - Courier optional VHCL_OPTION  
Baseline 96 points from top  
(copy)

Quad Left  
16/16sw - Courier  
Text Block  
180 points wide-19 char  
5 lines  
no hyphenation  
required Column 2:

VHCL_OPTION-other  
baseline 40 points from top  
(copy)

Quad Center  
16/16sw - Courier  
Text Block  
180 points wide-19 char  
7 lines  
no hyphenation  
optional Column 3:

Xtra-Text 1  
baseline 18.5 points from top  
(copy)

Quad Center  
16/16sw - Courier  
Text Block  
180 points wide-19 char  
3 lines  
no hyphenation  
optional Xtra_Text 2  
Baseline 65 points from top  
(copy)

Quad Left  
16/16sw - Courier  
Text Block  
180 points wide-19 char  
5 lines  
no hyphenation Seller_ID  
Baseline - 176 from top  
(copy)  
16/16sw - Courier  
Text Block  
180 points wide-19 char Quad Right  
Photo Ad:  
1 line Listing Header:

MFG_NAME + MODEL_NAME  
separated by space/hyphen/space  
Baseline 21 points from top rule  
Quad Center - Column 2  
18/18sw CourierBold required Listing Text:

Column 1:

CUSTOMER_PHONE_NUMBER  
Follows SELLING_PRICE  
Baseline 18 points from top  
PHONE: (1 space) (copy)  
Quad Left  
16/16sw - Courier required PHONE_ExtraLine  
Follows CUSTOMER_PHONE_NUMBER  
Baseline 18 points from top  
PHONE: (1 space) (copy)  
Quad Left  
16/16sw - Courier required PRICE_ExtraLine  
Follows SELLING_PRICE  
Baseline 49.5 points from top  
(10 spaces) (copy)  
Quad Left  
16/16sw - Courier optional VHCL_OPTION  
Baseline 65 points from top  
(copy)

Quad Left  
16/16sw - Courier  
Text Block  
180 points wide-19 char  
7 lines  
no hyphenation  
required Column 2:

Xtra_Line Copy  
Baseline 32 points from top  
Quad Center  
16/16sw - Courier  
19 character string optional MANUFACTURE_YR  
Baseline 53 points from top  
(Copy)  
Quad Left  
16/16sw - Courier required SELLING_PRICE  
Follows MANUFACTURE_YR  
Baseline 53 points from top  
(copy)  
Quad Right  
16/16sw - Courier required Column 3:

Xtra_Text 1  
Baseline 18 points from top  
(copy)

(Quad Left)  
16/16sw - Courier  
Text Block  
180 points wide-19 char  
3 lines  
no hyphenation  
optional Xtra_Text 2  
Baseline 65 points from top  
(copy)

Quad Left  
16/16sw - Courier  
Text Block  
180 points wide-19 char  
5 lines  
no hyphenation Seller_ID  
Baseline - 176 points from top  
(copy)

Quad Right  
16/16sw - Courier  
Text Block  
180 points wide-19 char  
1 line

4. Image/Halftone Requirements:  
    Image Size: 108 points V/180 points H  
    Image Position: Center Column 2 55 points from top rule  
    Halftone Screen: Dithered by Fax Rip  
    Contrast Range: dmin 20 dmax 80  
    LineArtResolution: 200 pi h/v  
5. Display Advertising Requirements:

Any number of sectors on the page may be used for display advertising. Sectors may be combined both horizontally and vertically up to an entire page. Recommendation for selection of fonts and images are provided to insure that advertising will image effectively on both fax and NTSC.

6. Filler Advertising Requirements:

Any number of sectors on the page may be used for filler advertising. Sectors may be combined both horizontally and vertically.

7. Starter Pages And Fax Footers:

All ads will be preceded by a fax starter page, which will contain information about the query, and the results of that query. Information included in the first page header:

1) Receiving Fax Number
2) Number of pages included in the fax
3) Query that generated the fax The fax header also contains graphic elements that identify the product. There are different variations of fax starter pages for local and long-distance transmissions. Fax starter pages are selected by destination fax number. Footers contain product identification information, as well as the phone number of the service.

Figure 3:
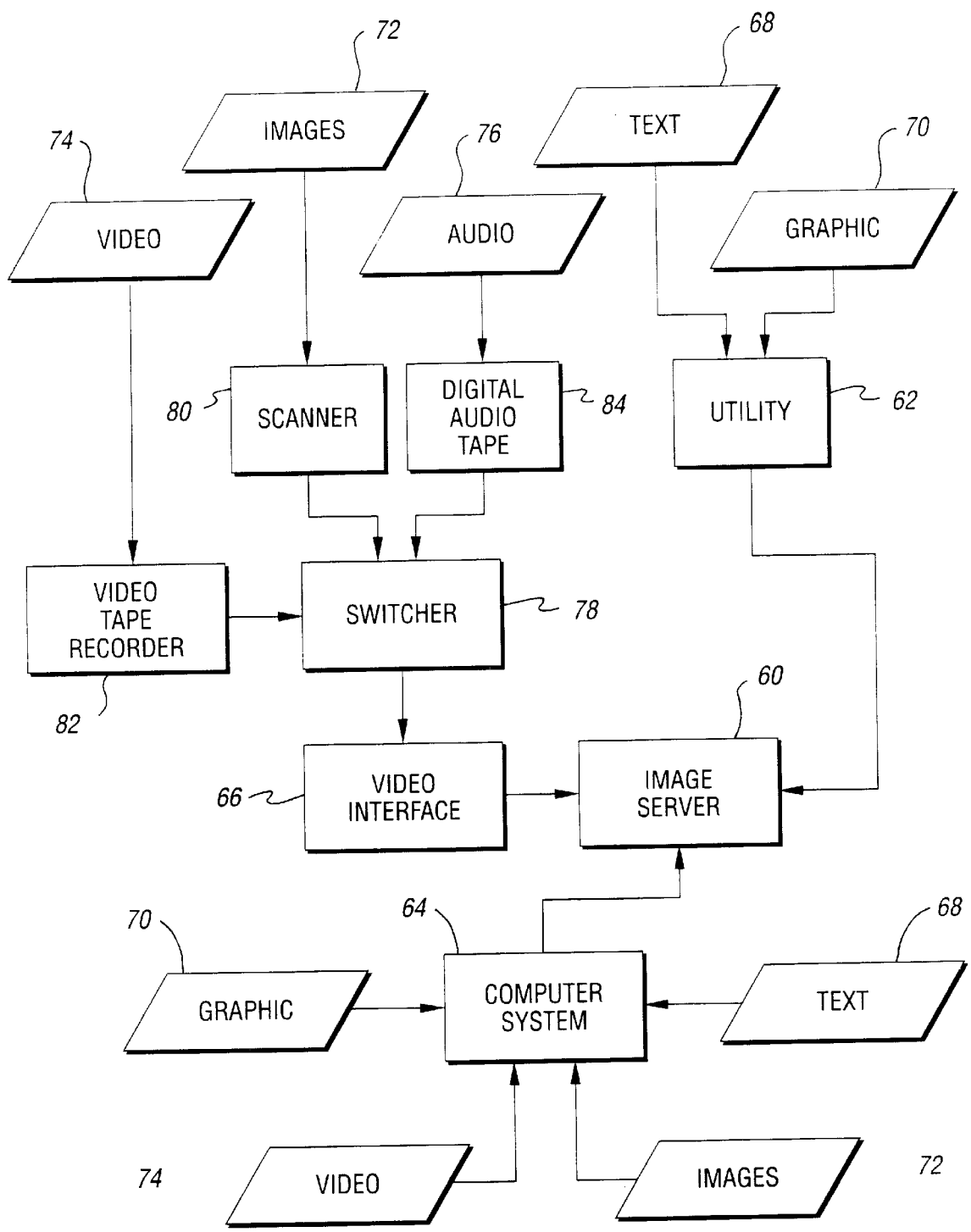
FIG. 3 is a block diagram of an image server for use in the method and system of the present invention.

Referring next to FIG. 3, a block diagram of an image server (60) for use in the method and system of the present invention is shown. As is readily apparent, imager server (60) may take the place of fax server (40) from FIG. 2.

Image server (60) is provided in communication with various standard input devices including a capturing utility (62) (not shown in FIG. 2), a computer system (64), and a video interface (66) in order to receive text (68), graphic (70), image (72), video (74), and audio (76) information. For such purposes, video interface (66) is itself provided in communication with a switcher (78). Switcher (78) coordinates image (72), video (74), and audio (76) information via a scanner (80), a video tape recorder (82), and a digital audio tape (84), respectively, for transmission to video interface (66) and image server (60).

As described above in detail with respect to FIG. 2, image server (60) is also provided in communication with a database server (not shown) that includes appropriate image composing programs, or templates. Using such a template, text (68), graphic (70), image (72), video (74), and audio (76) elements gathered as a result of a database query are processed for static hard-copy output to full-motion animation and/or audio, depending upon the media type desired.

As also described above in detail with respect to FIG. 2, image server (60) is also provided in communication with appropriate image systems (not shown) such as computer terminals or television screens. Once the data elements (68, 70, 72, 74, 76) have been properly formatted via the appropriate image template, the corresponding image system transmits the actual image output.

As can be seen from FIGS. 2 and 3, the method and system of the present invention thus permit, for example, text consisting of information from classified ads to be formatted with graphic images such as pictures of automobiles or homes into a fax document, computer screen or television screen format. Both the textual and graphic data are stored and recalled from a common relational database. Images are preferably stored as a single frame of a 30 frame per second television image so that each can be delivered as a still image or many frames can be delivered to produce motion video.

Figure 4:
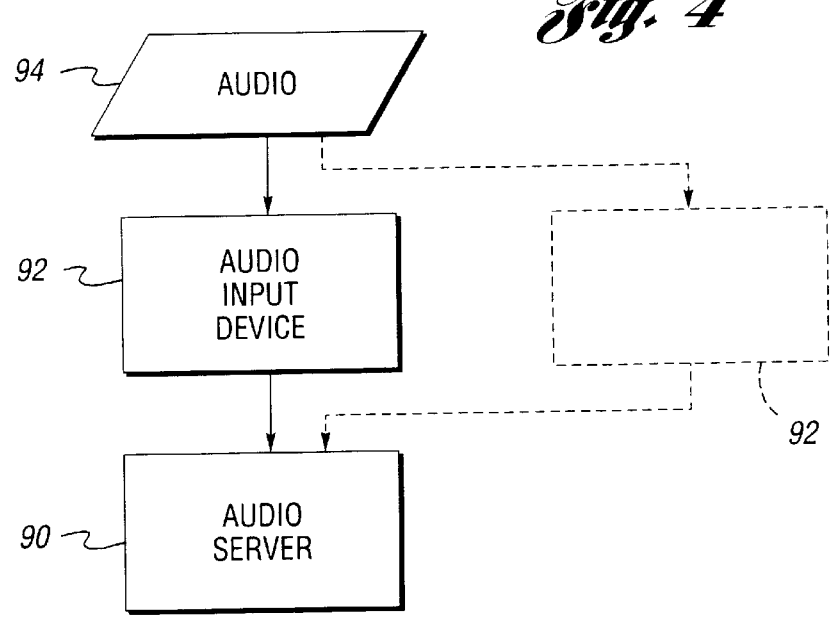
FIG. 4 is a block diagram of an audio server for use in the method and system of the present invention.

Referring finally to FIG. 4, a block diagram of an audio server (90) for use in the method and system of the present invention is shown. As is again readily apparent, audio server (90) may take the place of fax server (40) and/or image server (60) of FIGS. 2 and 3, respectively.

Like image server (60), audio server (90) is also provided in communication with one or more standard audio input devices (92), such as the digital audio tape (84) depicted in FIG. 3. Such audio input devices (92) permit audio server (90) to receive audio information (94).

Once again, as described above in detail with respect to FIG. 2, audio server (90) is provided in communication with a database server (not shown) that includes appropriate audio composing programs, or templates. Using such a template, audio (94) elements gathered as a result of a database query are processed for output according to the specific type of audio media desired.

As also described above in detail with respect to FIG. 2, audio server (90) is also provided in communication with appropriate audio systems (not shown) such as a telephone. Once the data elements (94) have been properly formatted via the appropriate audio template, the corresponding audio system transmits the actual audio output.

As is readily apparent from the foregoing description, then, the present invention provides an improved method and system for interacting with a database via a plurality of media. More specifically, the present invention provides a method and system which permit each data asset to be stored only once as a unique entity, and format such assets as needed according to user search criteria for immediate output via any media type requested. In such a fashion, such a method and system reduce and/or eliminate the production time and storage requirement problems of the prior art, while allowing real time interaction with the database.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

We claim:

1. A method for interacting with a database via a plurality of media, the database having data lacking a format for use with each one of the plurality of media, the method comprising:

providing a plurality of templates, each one of a plurality of templates corresponding to one of the plurality of media and including data processing instructions;

selecting data to be accessed;

selecting one of the plurality of media for providing access to the selected data;

selecting one of the plurality of templates, the one of the plurality of templates selected corresponding to the selected media;

processing the selected data according to the data processing instructions of the template; and transmitting the processed data for output via the selected media.

2. The method of claim 1 wherein the selected data is from the group consisting of video data, graphic data, text data and audio data.

3. The method of claim 1 wherein the selected media is from the group consisting of a telephone, a television, a facsimile machine, a computer terminal and a hearing impaired terminal.

4. The method of claim 1 wherein selecting data to be accessed comprises:

selecting one of the plurality of media for inputting a search criterion to the database; and searching the database according to the search criterion.

5. The method of claim 4 wherein the one of the plurality of media selected for inputting a search criterion is from the group consisting of a telephone, a television, a facsimile machine, a computer terminal and a hearing impaired terminal.

6. The method of claim 1 wherein processing the selected data comprises creating a plurality of frames for an image having multiple frames per second so that one of the plurality of frames may be output as a static image, and so that the plurality of frames may be output as a motion image.

7. The method of claim 1 wherein processing the selected data comprises determining a timing for audio data.

8. The method of claim 1 wherein processing the selected data comprises:

determining a location for graphic data;

determining a location for text data; and determining a page break location.

9. The method of claim 1 wherein processing the selected data comprises:

determining a background color;

determining a location for text data; and determining a timing for audio data.

10. An automated system for interacting with a database via a plurality of media, the database having data lacking a format for use with each one of the plurality of media, the system comprising:

a plurality of templates, each one of the plurality of templates corresponding to one of the plurality of media and including data processing instructions;

means for selecting data to be accessed;

means for selecting one of the plurality of media for providing access to the selected data;

means for selecting one of the plurality of templates, the one of the plurality of templates selected corresponding to the selected media; and means for transmitting the selected data for output via the selected media.

11. The system of claim 10 wherein the selected data is from the group consisting of video data, graphic data, text data and audio data.

12. The system of claim 10 wherein the selected media is from the group consisting of a telephone, a television, a facsimile machine, a computer terminal and a hearing impaired terminal.

13. The system of claim 10 wherein the means for selecting data to be accessed comprises:

means for inputting a search criterion to the database; and means for searching the database according to the search criterion.

14. The system of claim 13 wherein the means for inputting a search criterion is selected from the group consisting of a telephone, a television, a facsimile machine, a computer terminal and a hearing impaired terminal.

15. The system of claim 10 wherein the means for processing the selected data comprises means for creating a plurality of frames for an image having multiple frames per second so that any one of the plurality of frames may be output as a static image, and so that the plurality of frames may be output as a motion image.

16. The system of claim 10 wherein the means for processing the selected data comprises means for determining a timing for audio data.

17. The system of claim 10 wherein the means for processing the selected data comprises:

means for determining a location for graphic data;

means for determining a location for text data; and means for determining a page break location.

18. The system of claim 10 wherein the means for processing the selected data comprises:

means for determining a background color;

means for determining a location for text data; and means for determining a timing for audio data.

* * * * *